US 007938991B2

(12) United States Patent
Armeniades et al.

(10) Patent No.: US 7,938,991 B2
(45) Date of Patent: May 10, 2011

(54) POLYMER / CARBON-NANOTUBE INTERPENETRATING NETWORKS AND PROCESS FOR MAKING SAME

(75) Inventors: Constantine D. Armeniades, Houston, TX (US); Enrique V. Barrera, Houston, TX (US); Jong Dae Kim, Seoul (KR)

(73) Assignee: William Marsh Rice University, Houston, TX (US)

( * ) Notice: Subject to any disclaimer, the term of this patent is extended or adjusted under 35 U.S.C. 154(b) by 883 days.

(21) Appl. No.: 11/632,196

(22) PCT Filed: Jul. 22, 2005

(86) PCT No.: PCT/US2005/026284
§ 371 (c)(1),
(2), (4) Date: Aug. 24, 2007

(87) PCT Pub. No.: WO2007/008214
PCT Pub. Date: Jan. 18, 2007

(65) Prior Publication Data
US 2008/0048364 A1    Feb. 28, 2008

Related U.S. Application Data

(60) Provisional application No. 60/590,263, filed on Jul. 22, 2004.

(51) Int. Cl.
*B29B 9/10* (2006.01)
(52) U.S. Cl. .................................. 264/6; 264/9; 264/12
(58) Field of Classification Search ........................ None
See application file for complete search history.

(56) References Cited

U.S. PATENT DOCUMENTS
2003/0054218 A1 * 3/2003 Hampden-Smith et al. ..... 429/27

FOREIGN PATENT DOCUMENTS
| EP | 1 589 079 | 10/2005 |
|---|---|---|
| JP | 2003/238698 | 8/2003 |
| WO | WO 91/01621 | 2/1991 |
| WO | WO 96/18059 | 6/1996 |
| WO | WO 03/013199 | 2/2003 |
| WO | WO 03/080513 | 10/2003 |
| WO | WO 2005/012171 | 2/2005 |
| WO | WO 2005/028174 | 3/2005 |
| WO | WO 2005/051552 | 6/2005 |

OTHER PUBLICATIONS

Smith et al., "Space durable polymer/carbon nanotube films for electrostatic charge mitigation", 45(3) Polymer (2004), pp. 825-836.
International Preliminary Report on Patentability (PCT/US05/026284), dated Apr. 3, 2007.

* cited by examiner

*Primary Examiner* — Mary Lynn F Theisen
(74) *Attorney, Agent, or Firm* — Winstead PC

(57) ABSTRACT

The present invention is directed to new methods for combining, processing, and modifying existing materials, resulting in novel products with enhanced mechanical, electrical and electronic properties. The present invention provides for polymer/carbon nanotube composites with increased strength and toughness; beneficial for lighter and/or stronger structural components for terrestrial and aerospace applications, electrically and thermally conductive polymer composites, and electrostatic dissipative materials. Such composites rely on a molecular interpenetration between entangled single-wall carbon nanotubes (SWNTs) and cross-linked polymers to a degree not possible with previous processes.

15 Claims, 11 Drawing Sheets

PREHEATED

NO CNTs

LOW CNTs

MEDIUM CNTs

HIGH CNTs

FIG. 9
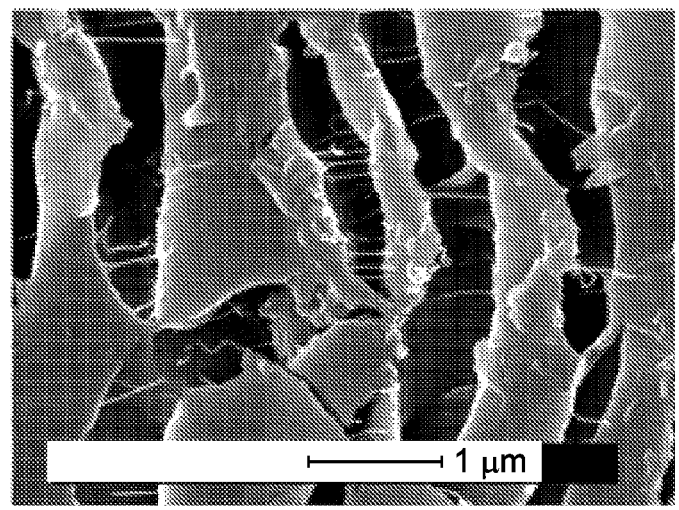
FIG. 10A  FIG. 10B
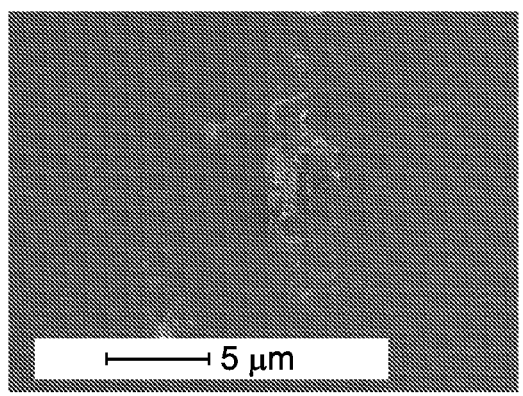 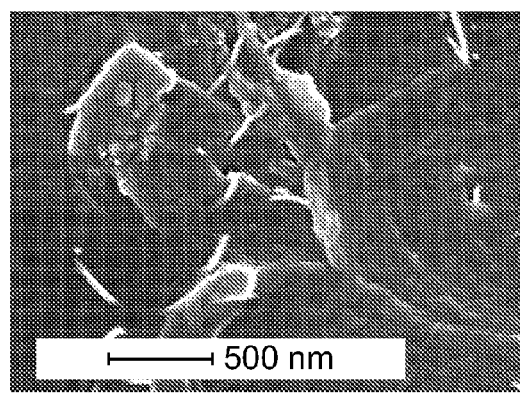

FIG. 15A
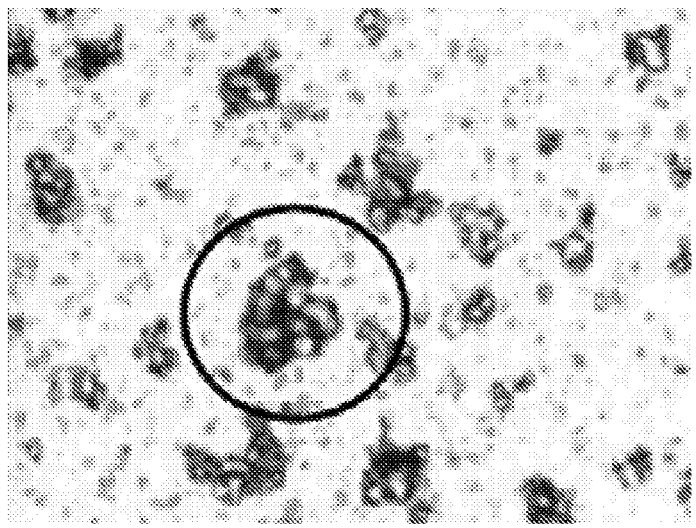 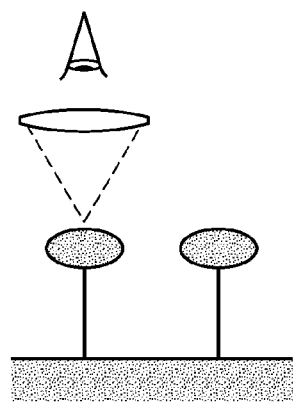
FIG. 15B
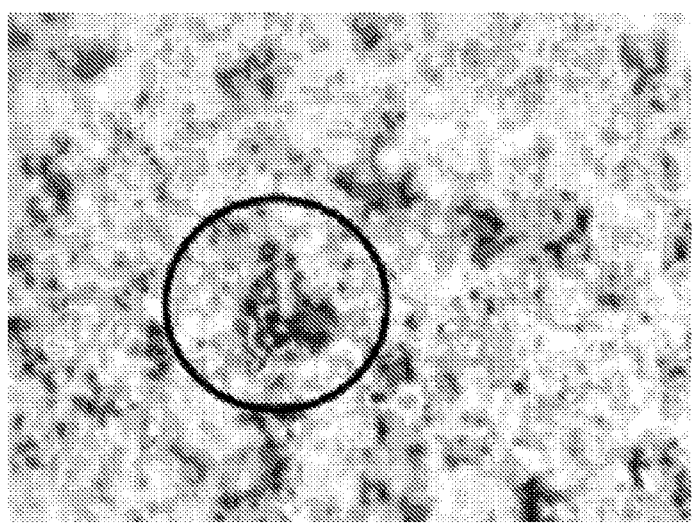 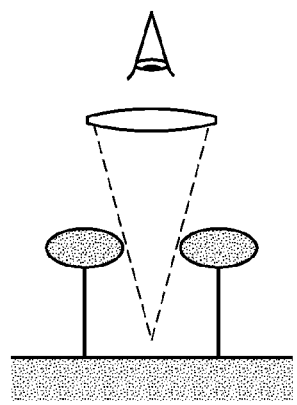

POLYMER / CARBON-NANOTUBE INTERPENETRATING NETWORKS AND PROCESS FOR MAKING SAME

CROSS-REFERENCES TO RELATED APPLICATIONS

This application for Patent is a national phase application of PCT/US2005/026284, entitled "Polymer/Carbon-Nanotube Interpenetrating Networks and Process for Making Same", filed Jul. 22, 2005, claiming priority to and benefit of U.S. Provisional Patent Application Ser. No. 60/590,263, filed Jul. 22, 2004.

This invention was made with government support under Office of Naval Research Grant No. N00014-03-1-0296, awarded by the United States Navy; and Grant No. NCC-1-02038, awarded by the National Aeronautics and Space Administration.

FIELD OF THE INVENTION

The present invention relates generally to enhanced polymer composites, and specifically to methods of enhancing the properties of carbon nanotube-enhanced polymer composites by forming interpenetrating networks.

BACKGROUND OF THE INVENTION

Carbon nanotubes (CNTs), comprising multiple concentric shells and termed multi-walled carbon nanotubes (MWNTs), were discovered by Iijima in 1991 (Iijima, *Nature*, 1991, 354, 56). Subsequent to this discovery, single-walled carbon nanotubes (SWNTs), comprising a single graphene rolled up on itself, were synthesized in an arc-discharge process using carbon electrodes doped with transition metals [Iijima et al., *Nature*, 1993, 363, 603; and Bethune et al., *Nature*, 1993, 363, 605).

The seamless graphitic structure of single-walled carbon nanotubes (SWNTs) endows these materials with exceptional mechanical properties: Young's modulus in the low TPa range and (estimated) tensile strengths in excess of 37 GPa (Treacy et al., *Nature* 1996, 381, 678; Ruoff et al., *Carbon* 1995, 33, 925; Yakobson et al., *Phys. Rev. Lett.* 1996, 76, 2411; Lourie et al., *J. Mater. Res.* 1998, 13, 2418; Iijima et al., *J. Chem. Phys.* 1996, 104, 2089; Cornwell et al., *Solid State Comm.* 1997, 101, 555; Lu, *Phys. Rev. Lett.* 1997, 79, 1297; Saito et al. *Physical Properties of Carbon Nanotubes*, Imperial College Press: London (1998); Yu et al., *Phys. Rev. Lett.* 2000, 84, 5552). Electron microscopy studies of SWNTs have shown that the nanotubes, although extremely strong in tension, are very flexible in bending (Lourie et al. *Phys. Rev. Lett.* 1998, 81, 1638; Vigolo et al., *Science* 2000, 290, 1331). Consequently, one would expect that incorporation of SWNTs as reinforcement in polymeric matrices could generate composites with greatly enhanced strength and toughness. To achieve this goal, the composites must possess sufficient structural continuity, so that external loads, imposed on the composite can be efficiently shared by the soft polymer matrix and the ultra high-strength nanotubes.

Several investigators have prepared a variety of composites, by embedding SWNTs in epoxy resins and other polymer matrices (Lozano et al., *J. Appl. Polym. Sci.* 2001, 79, 125; Lozano et al., *J. Appl. Polym. Sci.* 2001, 80, 1162; Schadler et al., *Appl. Phys. Lett.* 1998, 73, 3842; Ajayan et al., *Adv. Mater.* 2000, 12, 750). In most cases, the resulting composites have shown unremarkable mechanical properties and poor polymer-nanotube adhesion. The composites fractured at stresses, comparable to those of the non-reinforced polymer, with intact nanotubes pulling out from the matrix of either fragment. In all of these preparations the nanotubes were present in the matrix as discrete entities or small bundles. Hence, structural continuity within the composite depended entirely on adhesive (secondary) bonds between individual nanotubes and polymer chains. Given the marked difference in interfacial free energy between carbon nanotubes and organic macromolecules, it is not surprising that the adhesive bonds between these two entities are poor and the presence of discrete nanotubes does not strengthen the composite.

BRIEF DESCRIPTION OF THE INVENTION

The present invention is directed to new methods for combining, processing, and modifying existing materials, resulting in novel products with enhanced mechanical, electrical and electronic properties. The present invention provides for polymer/carbon nanotube (polymer/CNT) composites with increased strength and toughness; typically being beneficial for lighter and/or stronger structural components for a variety of terrestrial and aerospace applications, electrically and thermally conductive polymer composites, and electrostatic dissipative materials. Such composites rely on a molecular interpenetration between entangled single-walled carbon nanotubes (SWNTs) and cross-linked polymers to a degree not possible with previous processes. As CNTs, and especially SWNTs, can be viewed as polymers themselves, such polymer/CNT composites can be viewed as hybrid polymer systems wherein the nanotube component provides reinforcement.

In some embodiments, the present invention is directed to methods of producing polymer/CNT composites, the methods comprising the steps of: (1) providing entangled agglomerates of CNTs; (2) processing the agglomerates such that they are penetrated with polymer or polymer precursor material; (3) optionally linking the agglomerates; and (4) optionally permitting bonding between the polymer material and the agglomerates and/or between the agglomerates.

In some embodiments, the present invention is directed at methods of producing polymer/CNT composites, the methods comprising the steps of: (1) introducing CNTs and prepolymer molecules into a solvent to form a solvent mixture; (2) atomizing the solvent mixture into micro-droplets via spraying; (3) rapidly removing the solvent from the micro-droplets and, simultaneously, fully or at least partially curing the prepolymer to provide solid polymer/CNT particles; and (4) depositing the solid polymer/CNT particles on a surface to form a polymer/CNT composite layer.

In some embodiments, a B-stage powder (partially cured prepolymer) is formed, wherein said powder is comprised of particles, the particles comprising: (1) CNTs; (2) polymer material that forms an interpenetrating network with the CNTs and which is partially cured at least to an extent so as to prevent to re-bundling of the CNTs; and (3) at least one unactivated curing agent capable of further curing the polymer material.

In some embodiments, a plurality of B-stage particles comprising partially cured polymer material can be further cured to form bulk objects comprising interpenetrating networks of CNTs and polymeric material. In some of these embodiments, there is an incipient-wetting of the B-stage particles with additional CNT material. In some or other of these embodiments, additional polymeric material may be added to the B-stage particles. In some embodiments, the further curing is done during a high-shear extrusion process. Additionally or alternatively, the further curing can be done in conjunction with solid free-form fabrication. One such exemplary solid free-form fabrication process is rapid prototyping.

In some embodiments, the interpenetrating networks of carbon nanotubes and polymer are used to reinforce other fiber forms, such as glass fibers, Kevlar®, carbon fibers, or other fiber systems.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 9 depicts SEM micrographs of the fracture surface of a 1 weight % as-received SWNT/epoxy sprayed composite;

FIGS. 10(A) and 10(B) depict SEM micrographs of the fracture surface of a 0.1 weight % as-received SWNTs/epoxy sprayed composite: (A) 5,000 times (B) 50,000 times;

FIGS. 15(a) and 15(b) are optical microscopy images depicting aligned SWNT/epoxy on a substrate after a single shot (spay) onto the preheated substrate, wherein the associated schematic diagrams show the different views obtained by changing the focal point on the same sample during the imaging process;

DETAILED DESCRIPTION OF THE INVENTION

The present invention is directed to methods of preparing polymer/carbon nanotube (polymer/CNT) composites wherein such methods promote molecular interpenetration between entangled carbon nanotubes (CNTs) and cross-linked polymers. The present invention is also directed to the polymer/CNT composites produced by such methods. While the making and/or using of various embodiments of the present invention are discussed below, it should be appreciated that the present invention provides many applicable inventive concepts that may be embodied in a variety of specific contexts. The specific embodiments discussed herein are merely illustrative of specific ways to make and/or use the invention and are not intended to delimit the scope of the invention.

Carbon nanotubes (CNTs), according to the present invention, include, but are not limited to, single-walled carbon nanotubes (SWNTs), multi-walled carbon nanotubes (MWNTs), double-walled carbon nanotubes (DWNTs), buckytubes, fullerene tubes, tubular fullerenes, graphite fibrils, and combinations thereof. Such carbon nanotubes can be made by any known technique including, but not limited to the HiPco® process, (Bronikowski et al., *J. Vac. Sci. Technol. A*. 2001, 19, 1800), arc discharge (Ebbesen, *Annu. Rev. Mater. Sci.* 1994, 24, 235), laser oven (Thess et al., *Science* 1996, 273, 483), flame synthesis (Vander Wal et al., *Chem. Phys. Lett.* 2001, 349, 178), chemical vapor deposition (U.S. Pat. No. 5,374,415), wherein a supported (Hafner et al., *Chem. Phys. Lett.* 1998, 296, 195) or an unsupported (Cheng et al., *Chem. Phys. Lett.* 1998, 289, 602; and Nikolaev et al., *Chem. Phys. Lett.* 1999, 313, 91) metal catalyst may also be used, and combinations thereof. Depending on the embodiment, the CNTs can be subjected to one or more processing steps prior to subjecting them to any of the processes of the present invention. In some embodiments, the CNTs are separated based on a property selected from the group consisting of chirality, electrical conductivity, thermal conductivity, diameter, length, number of walls, and combinations thereof. See O'Connell et al., *Science* 2002, 297, 593; Bachilo et al., *Science* 2002, 298, 2361; Strano et al., *Science* 2003, 301, 1519. In some embodiments, the CNTs have been purified. Exemplary purification techniques include, but are not limited to, those by Chiang et al. (Chiang et al., *J. Phys. Chem. B* 2001, 105, 1157; Chiang et al., *J. Phys. Chem. B* 2001, 105, 8297). In some embodiments, the CNTs have been cut by a cutting process. See Liu et al., *Science* 1998, 280, 1253; Gu et al., *Nano Lett.* 2002, 2(9), 1009. The terms "CNT" and "nanotube" are used synonymously herein. Furthermore, while much of the discussion herein involves SWNTs, it should be understood that many of the methods and/or compositions of the present invention utilizing and/or comprising SWNTs can also utilize and/or comprise MWNTs or any of the other types of CNTs discussed above.

Figure 1A:
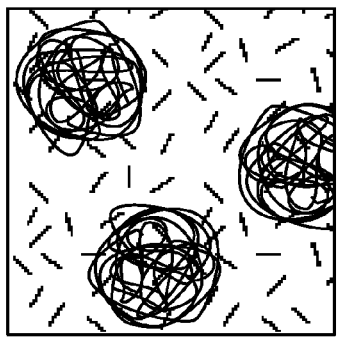
FIG. 1 is a schematic representation of the formation of polymer/CNT interpenetrating networks, wherein in the initial mixing step (1) tangled CNTs are dispersed into the liquid monomer system, after the interpenetration step (2) monomer molecules infuse/penetrate into the tangled CNTs networks causing them to swell, and after the curing step (3) macromolecular networks are generated by interpenetration of polymer into the expanded CNTs networks, forming a high-modulus, high-strength composite, wherein no phase separation occurs.
Figure 1B:
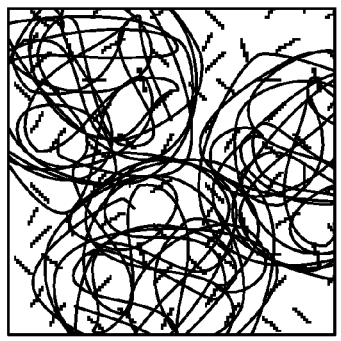
Figure 1C:
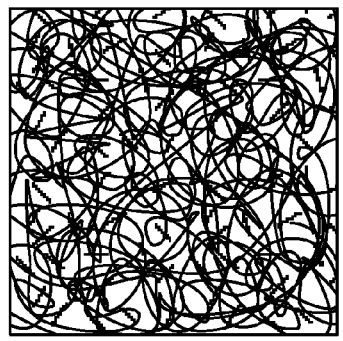
Figure 2A:
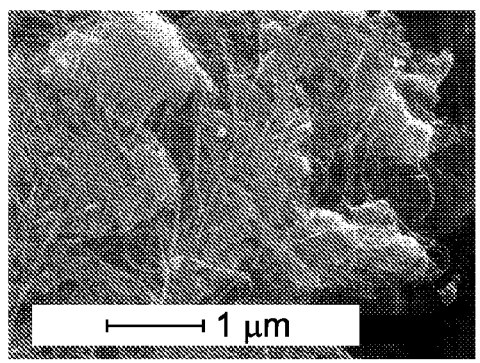
FIGS. 2(A)-2(C) depict SEM micrographs of as-received SWNTs; magnification of (A) 25,000 times, (B) 50,000 times, (C) 100,000 times.
Figure 2B:
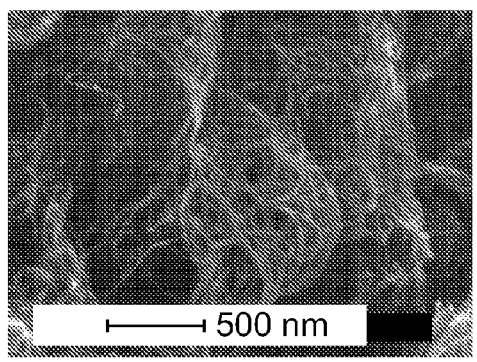
Figure 2C:
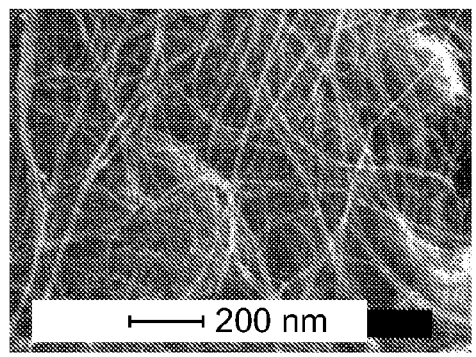

Generally, polymer/CNT composites of the present invention comprise interpenetrating nanofiber networks, the networks comprising mutually entangled carbon nanotubes intertwined with macromolecules in a cross-linked polymer matrix. Key to the successful practice of the present invention is the infusion of organic molecules capable of penetrating into the clumps of tangled CNTs, thereby causing the nanotube networks to expand and resulting in exfoliation. Subsequent in situ polymerization and curing of the organic molecules generates interpenetrating networks of entangled CNTs or CNT nanofibers (ropes), intertwined with cross-linked macromolecules. This is shown schematically in FIG. 1, wherein in the initial mixing step (1) tangled CNTs are dispersed into the liquid monomer system, after the interpenetration step (2) monomer molecules infuse/penetrate into the tangled CNT networks causing them to swell, and after the curing step (3) macromolecular networks are generated by interpenetration of polymer into the expanded CNT networks, forming a high-modulus, high-strength composite, wherein no phase separation occurs;

It should be noted that in their nascent state, SWNTs exist in the form of tangled networks, as exemplified by scanning electron micrographs, shown in FIGS. 2(A) and 2(B) taken at successively higher magnifications. These micrographs also show impurities, such as carbon black, soot, catalyst particles, etc., which are usually present. In some embodiments nascent, unpurified (as-produced) SWNTs are used—which may provide additional reinforcement (or other desired properties) to the composite by virtue of their impurities. Furthermore, these embodiments eliminate the usual purification and processing steps that add significantly to the cost, and possibly degrade the strength, of the SWNT assemblies.

Generally, the difference in surface free energy between CNTs and polymerizable organic molecules (prepolymers or monomers) is sufficiently high, so that when the two components are mixed, they remain separated into distinct phases: clumped carbon nanotubes suspended in the otherwise continuous organic phase. Use of mechanical energy, such as sonication or high shear, may, at best, reduce the size of the individual nanotube clumps, but it does not enable substantial penetration of the organic molecules.

A very small number of organic liquids (solvents), such as N,N-dimethylformamide (DMF), are capable of dissolving carbon nanotubes at low concentrations (Ausman et al., *J. Phys. Chem. B* 2000, 104, 8911), although such solutions may not always be solutions in the true thermodynamic sense. The same liquids are also solvents for a wide variety of prepolymers. In some embodiments, the present invention takes advantage of this mutual solubility and combines it with atomization and spraying techniques to generate composites with the desired interpenetrating network structures. Generally, the methods involved in fabricating CNT-polymer interpenetrating networks comprise the following steps: (1) introducing prepolymer molecules and CNTs into one of the few organic solvents that can disperse or dissolve small amounts of CNTs in order to form a solvent mixture; (2) promoting CNT dissolution within the mixture using a technique selected from the group consisting of sonication, heating, mechanical shear, combinations thereof, and/or other appropriate means; (3) atomizing the (possibly heated) solution into fine droplets, using standard spraying equipment; and (4) depositing the droplets onto a surface via spraying, using heat and, possibly, vacuum to effect rapid and simultaneous evaporation of the solvent and initial curing of the prepolymer, such that the droplets solidify before the CNTs have a chance to separate from the polymerizing system and re-aggregate due to solvent depletion.

Figure 3:
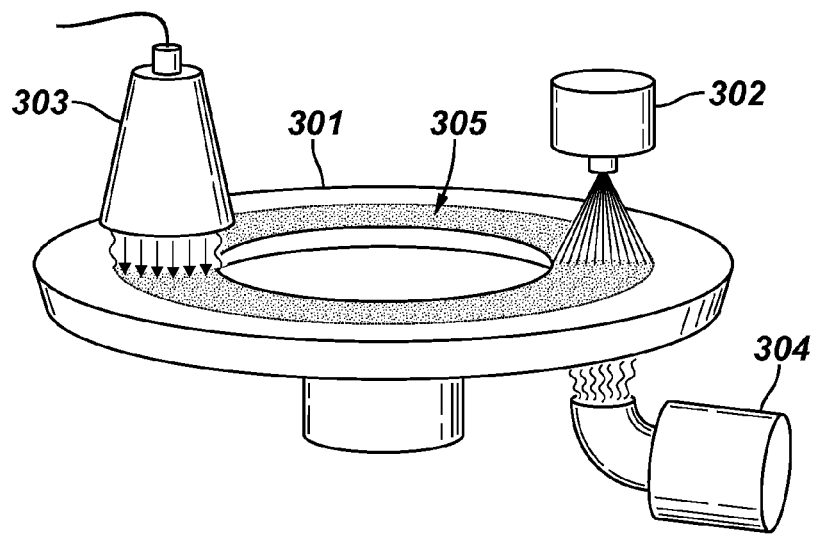
FIG. 3 is a schematic diagram of a spray process that generates continuous buildup of a polymer/CNT composite, wherein the thickness of the composite increases with the duration of spray, in accordance with some embodiments of the present invention.
Figure 4:
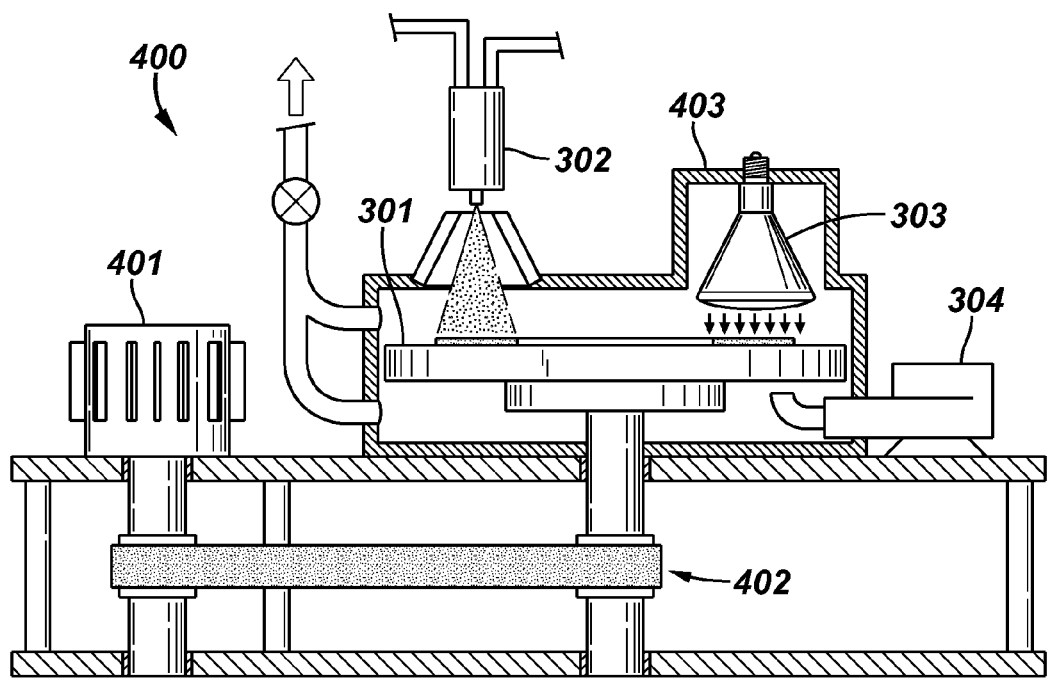
FIG. 4 is an illustrative cross-sectional view of an apparatus for spraying SWNT/prepolymer solutions, in accordance with some embodiments of the present invention.

In some embodiments, to generate composites in a desired shape and/or level of homogeneity, the above-described spray is deposited onto a moving surface, such as a rotating disc, in order to continuously build a homogeneous layer of composite material with a desired thickness, as shown schematically, and in exemplary terms, in FIG. 3 and FIG. 4. Referring to FIG. 3, a spray nozzle 302 deposits a polymer/CNT layer 305 on a rotating disk 301, the rotating disk being heated by a hot air gun 304 and the deposited layer being heated by an infrared lamp 303. FIG. 4 illustrates how the parts of FIG. 3 can be integrated into an apparatus 400 that is partially enclosed in a cabinet 403, wherein the rotating disk 301 is driven by a variable speed motor 401 and a gear and chain drive 402.

Test specimens and other objects can be cut from the above-described polymer/CNT layer. The process parameters can be easily controlled by adjusting the infrared lamp temperature, the temperature of the hot air gun, the air flow rate, the rotating stage speed, the spray pressure, the spray angle, etc. Multiple spray guns can be attached onto the above-described system to spray multiple distinct materials, such as a spray gun 1 spraying prepolymer/organic liquid A and a spray gun 2 spraying CNTs/organic liquid B. Spray guns spraying multiple concentrations of CNTs/prepolymer/organic liquid can also be installed in this system.

Figure 5:
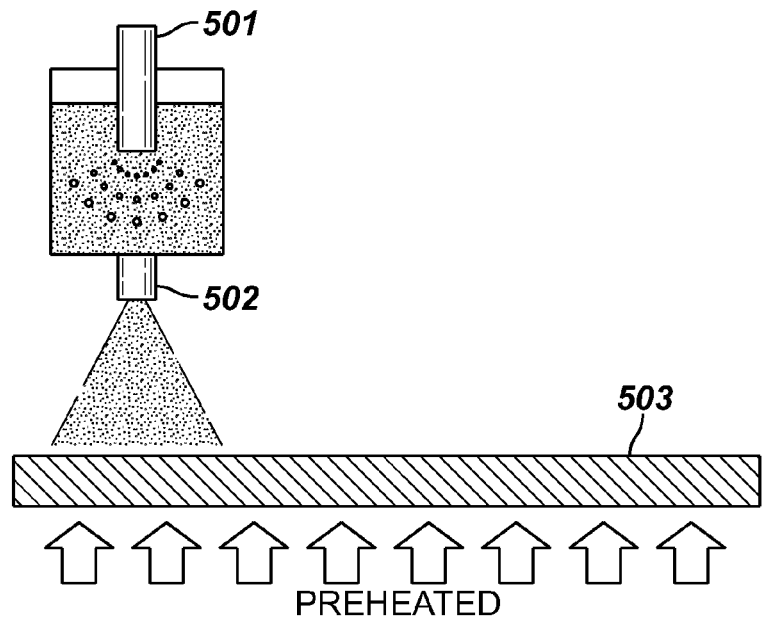
FIG. 5 is a schematic diagram showing a system for simultaneously sonicating and spraying a dispersion/solution of CNT/polymer/organic liquid, in accordance with some embodiments of the present invention.

Alternatively, in some embodiments, to enhance the homogeneity of the CNTs/prepolymer, the mixture of CNTs/prepolymer/organic liquid can be mechanically dispersed just before spraying through the nozzle by a built-in probe-type sonicator, which is just above the mixture reservoir, as shown schematically in FIG. 5. Referring to FIG. 5, a probe-type sonicator 501 sonicates a dispersion/solution of CNT/prepolymer/organic liquid immediately before being sprayed through nozzle 502 and onto preheated surface 503.

Figure 6A:
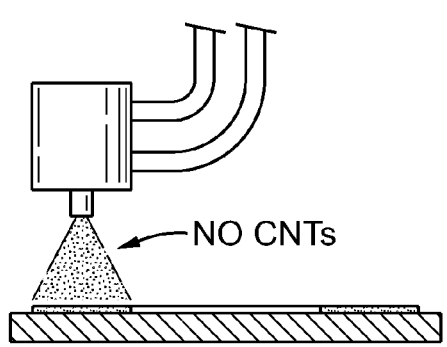
FIGS. 6(a)-6(d) illustrate the formation of a polymer/CNT layer comprising a CNT concentration gradient in the direction of the layer thickness, in accordance with some embodiments of the present invention, wherein such a gradient is formed by changing the concentration of the CNTs in the CNT/polymer/organic liquid during processing.
Figure 6B:
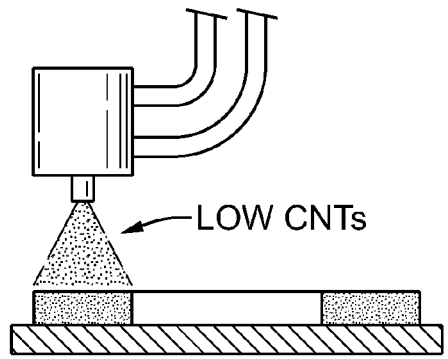
Figure 6C:
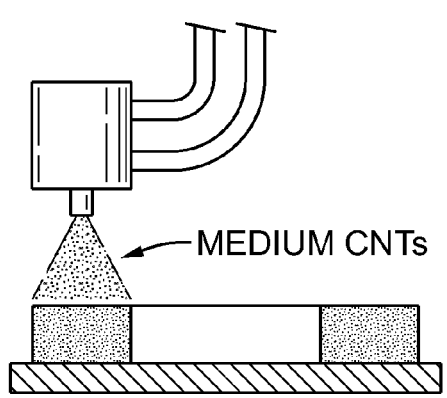
Figure 6D:
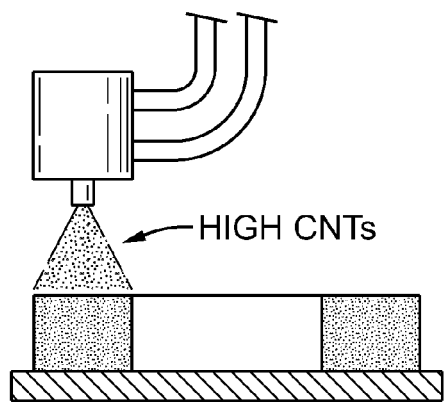

In some embodiments, the concentration of CNTs in the composite can be continuously changed by adjusting the spraying of the solution of CNTs/prepolymer/organic liquid. Referring to FIGS. 6(a)-6(d), the initial step of spraying only prepolymer/organic liquid is depicted in FIG. 6(a), and the gradual increasing of CNT concentration in the CNTs/prepolymer/organic liquid is depicted in FIGS. 6(b)-6(d). The final product can yield hybrid properties, if, e.g., one side is a conducting composite and the other side is an insulator.

Figure 7A:
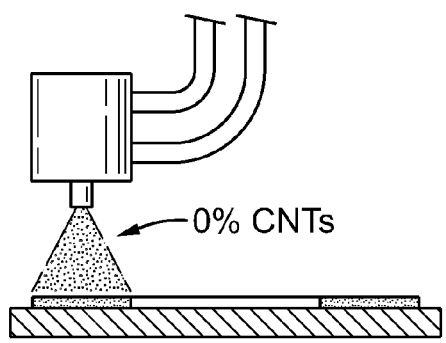
FIGS. 7(a)-7(f) illustrate the formation of a polymer/CNT layer comprising alternating sub-layers of different CNT concentration, in accordance with some embodiments of the present invention, wherein such a layered structure is formed by alternating the deposition of CNT/polymer/organic liquid with shots comprising different concentrations of CNTs (or a complete lack of CNTs)
Figure 7B:
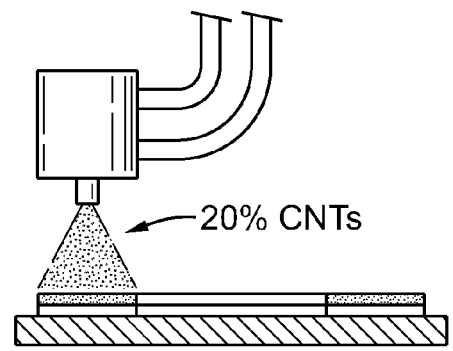
Figure 7C:
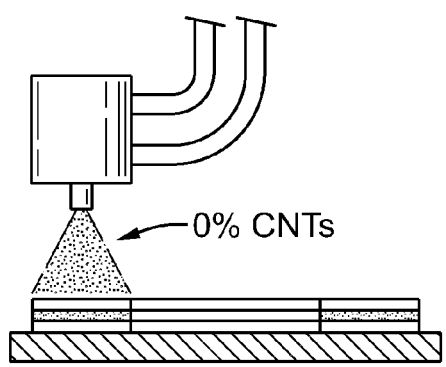
Figure 7D:
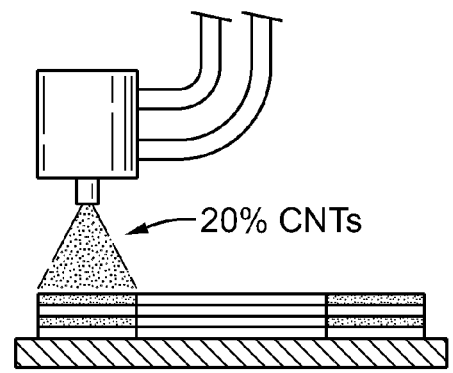
Figure 7E:
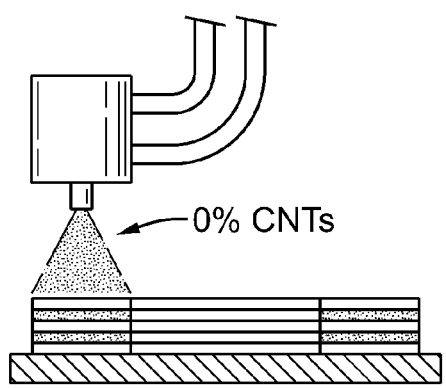
Figure 7F:
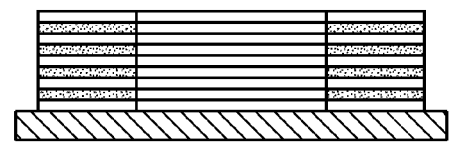

In some embodiments, the concentration of CNTs in the composite can be modulated by alternatively establishing sub-layers of different CNT concentration by alternating the spraying of CNTs/prepolymer/organic liquid solutions comprising different concentrations of CNTs. Referring to FIGS. 7(a)-7(f), the initial step of spraying only prepolymer/organic liquid (0% CNTs) is depicted in FIG. 7(a), the next step of spraying a CNTs/prepolymer/organic liquid solution of alternate CNT concentration (e.g., 20% CNTs) is depicted in FIG. 7(b), and FIGS. 7(c)-7(e) depict the repetition of the steps depicted in FIGS. 7(a) and 7(b) until reaching a desired thickness, and FIG. 7(f) depicts the expected final sample.

Alternatively, in some embodiments, a prepolymer system is employed with two independent curing agents. In such embodiments, the first agent, activated during the spraying and deposition of the droplets, provides an extent of polymerization sufficient to quickly solidify the droplets to a "B-stage" (partially cured prepolymer), thus preventing SWNT reaggregation. This step is shown schematically in FIG. 8, wherein the B-stage solid particles or aggregates are formed en route to a collector (a-c) and where such particles or aggregates are stable at ambient temperatures (or under refrigeration) and may be set aside for further processing. The B-stage particles can then be collected and molded into a desired shape using standard plastics processing methods (e.g., compression molding (d), extrusion (e), injection molding, etc.). This processing step provides further homogenization of the resulting composite since the B-stage particles retain thermoplastic properties for a short period of time. Generally, this takes place at temperatures higher than those typically used to solidify the sprayed droplets so that the second curing agent is then activated, thereby ensuring complete and homogeneous crosslinking of the polymer matrix throughout the molded object.

In some embodiments, an "incipient wetting" technique is employed. This is a technique for depositing SWNTs on polymer or other surfaces from dispersions in organic solvents (Barrera et al., International Patent Application Ser. No. PCT/US00/33291; and Barrera, JOM, 2000, 52, 38) and can be used to coat the surface of the B-stage particles with additional SWNTs prior to forming the final composite. Deformation and mixing of the (temporarily) thermoplastic particles, as a result of the heat and mechanical shear at the start their final processing, distributes the additional SWNTs within the composite, thus increasing its SWNT content.

In a number of embodiments, solutions of SWNTs and one or more of several epoxy prepolymers with a single curing agent are dispersed (dissolved) in an organic solvent (e.g., N,N-dimethyl formamide). These organic liquid/prepolymer/SWNT systems can then be heated and quickly atomized into fine droplets, which can then be sprayed into a preheated chamber, and deposited onto a preheated hot surface. The process is successful in achieving solvent evaporation, polymerization of the epoxy resin, and integration of the solidifying droplets into coherent layers of composite, simultaneously, in the brief period between atomization and droplet deposition. The success of such processes require that the rapid rates of solvent evaporation and polymerization/cure be independently controlled, so that the droplets solidify in flight before the SWNTs have a chance to separate from the emerging polymer and re-aggregate due to solvent depletion. However, when the solidified droplets reach their target surface, they must still retain residual reactivity in their nascent polymer, so as to coalesce and bond into a continuous solid. If polymerization lags, the solvent evaporates leaving an insufficiently polymerized (still fluid) droplet, the SWNTs tend to expel the organic molecules and re-clump (re-bundle). If polymerization outpaces evaporation, the droplets solidify too fast, tending to trap solvent and form defective aggregates. In either of the latter two cases, the mechanical properties of the resulting composite are possibly changed.

In some embodiments, solutions of liquid epoxy prepolymers are prepared (in organic solvents such as N,N-dimethylformamide) with one or more amine curing agents, wherein such solutions typically comprise ca. 1 weight % as-received SWNTs by weight. These solutions can then be atomized and sprayed onto a stationary surface, generating layered specimens of SWNTs/epoxy composites that show good SWNTs dispersion in the epoxy matrix (see, e.g., FIG. 9). The products of such processes have electrical properties, comparable to those of the pure epoxy system, and they show an increase in electrical resistivity from ca. $10^{+14}$ Ohm·m to ca. $10^{+0}$ Ohm·m (pure SWNTs: ca. $10^{-6}$ Ohm·m) as measured by a four-point probe test. Corresponding increases in thermal conductivity are expected.

A number of functionalization (i.e., derivatization) methods (Mickelson et al., Chem. Phys. Lett. 1998, 296, 188; Chen et al., J. Mater. Res. 1998, 13, 2423; Boul et al., Chem. Phys Lett. 1999, 310, 367; Barr et al., J. Am. Chem. Soc. 2001, 123, 5348; Ying et al., Organic Letters 2003, 5, 1471) have succeeded in covalently bonding several types of organic groups to carbon nanotubes. These methods increase the solubility of the resulting derivatized SWNTs in organic liquids (and the diversity of solvents in which they can be dispersed/dissolved), and can even provide covalent bonding between the SWNTs (or other CNT types) and the surrounding polymer matrix. Wherein the chemical treatments, necessary for these derivatizations do not disrupt the network conformations of the nascent SWNTs and/or significantly degrade their mechanical properties, their use in conjunction with the methods of the present invention should considerably enhance the range and versatility of the resulting composites. These enhancements range from the use of solvents that are incompatible with nascent SWNTs, to the direct incorporation of prepolymer systems into clumped nanotube networks without any solvent. One example is the use of "bucky paper" which has been functionalized so that it is compatible with epoxy prepolymers. Stacks of the functionalized bucky paper are swollen with the prepolymer, and then cured in situ, using conventional molding techniques. The process will produce composites with very high SWNT content. Such composites have the potential of exhibiting mechanical strength and electrical conductivity, comparable to that of the pure SWNTs.

Figure 11A:
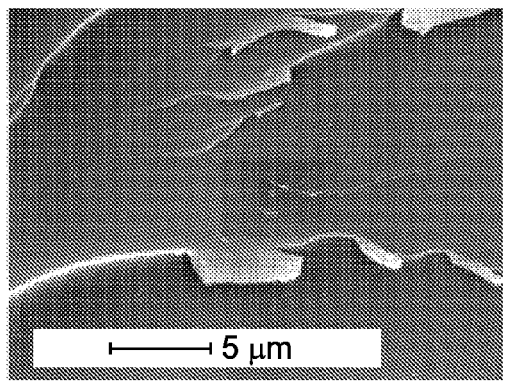
FIGS. 11(A) and 11(B) depict SEM micrographs of the fracture surface of 0.1 weight % carboxylic acid end-functionalized SWNT/epoxy sprayed composite: (A) 5,000 times (B) 50,000 times.
Figure 11B:
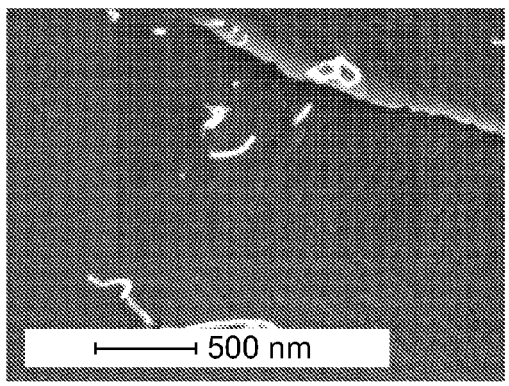

In some embodiments, to increase the dispersion of SWNTs, solutions of liquid epoxy prepolymers are prepared (in organic solvents such as N,N-dimethylformamide) with one or more amine curing agents, wherein the solution comprises ca. 0.1 weight % of carboxylic acid group end-functionalized SWNTs. These can then be atomized and sprayed onto a stationary surface, generating layered specimens of carboxylic acid functionalized SWNTs/epoxy composites that show increased SWNTs dispersion in the epoxy matrix (see FIGS. 11(A) and 11(B)) compared with 0.1 weight % of as-received SWNTs/epoxy composites (see FIGS. 10(A) and 10(B)).

Figure 12A:
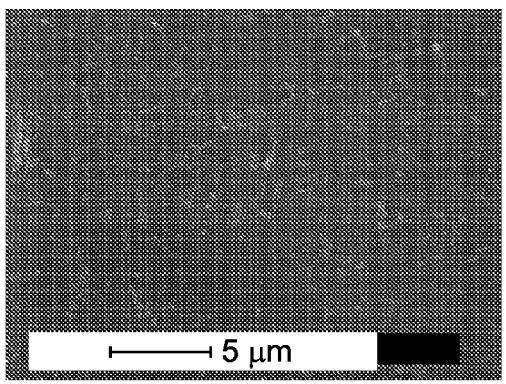
FIGS. 12(A) and 12(B) depict SEM micrographs of the fracture surface of 0.1 weight % carboxylic acid sidewall-functionalized SWNT/epoxy sprayed composite: (A) 5,000 times (B) 50,000 times.
Figure 12B:
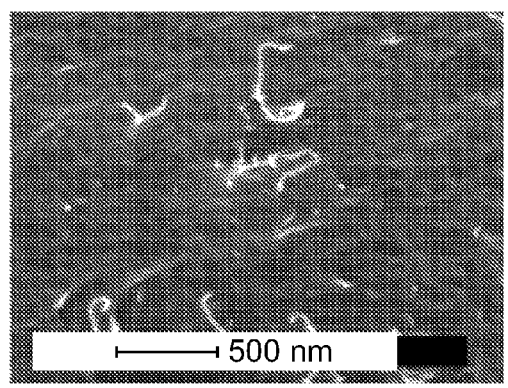

In some embodiments, to increase the dispersion of SWNTs, solutions of liquid epoxy prepolymers are prepared (in organic solvents such as N,N-dimethylformamide) with one or more amine curing agents, wherein the solution comprises ca. 0.1 weight % of carboxylic acid sidewall-functionalized SWNTs. These can then be atomized and sprayed onto a stationary surface generating layered specimens of carboxylic acid sidewall functionalized SWNT/epoxy composites that show high SWNTs dispersion in the epoxy matrix (see FIGS. 12(A) and 12(B)) compared with others (see FIGS. 10 and 11).

Figure 13:
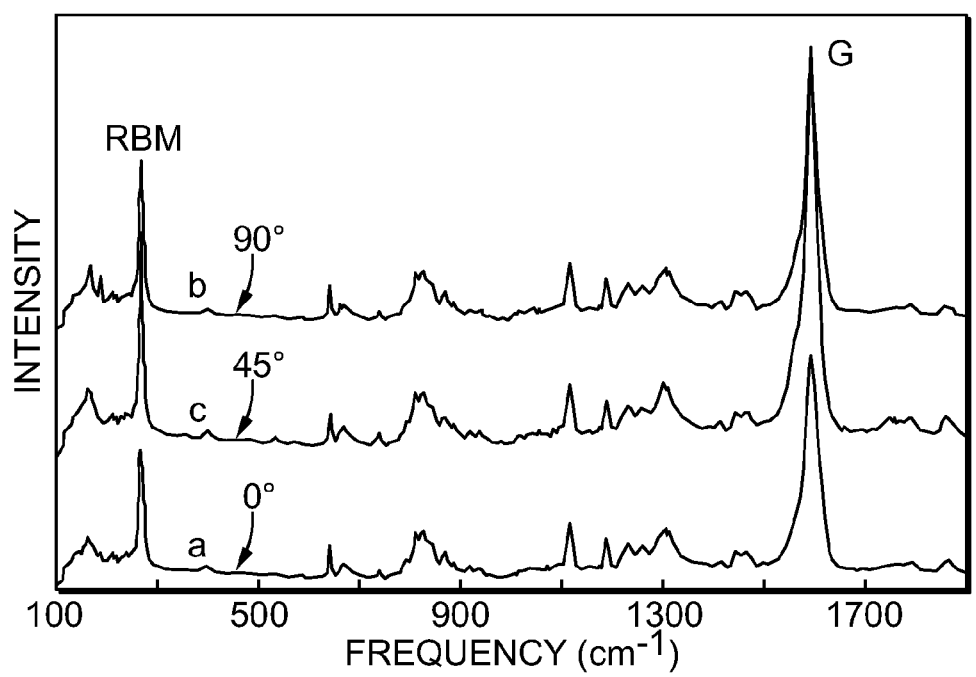
FIG. 13 depicts Raman spectra of the 0.1 weight % as-received SWNT/epoxy sprayed composite after exposure to a polarized laser beam, changing the incident angle: (a) 0 degrees, (c) 45 degrees, and (b) 90 degrees (RBM represents radial breathing mode and G represents tangential mode)
Figure 14:
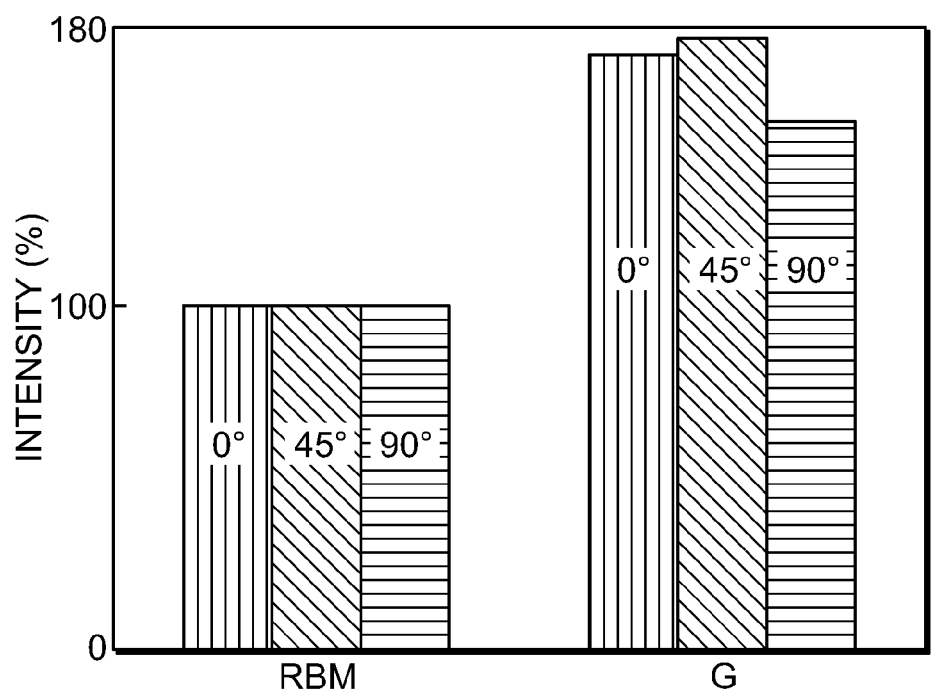
FIG. 14 summarizes the relative Raman intensity ratios of the RBM/G peaks depicted in FIG. 13.
Figure 16A:
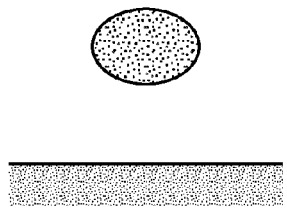
FIGS. 16(a)-16(i) illustrate a possible growth mechanism of aligned palm tree-like SWNT/epoxy columns, in accordance with some embodiments of the present invention.
Figure 16B:
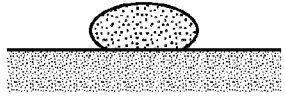
Figure 16C:
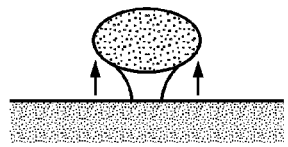
Figure 16D:
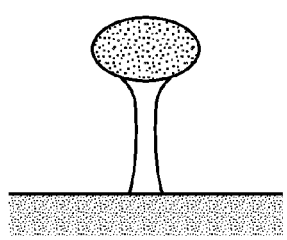
Figure 16E:
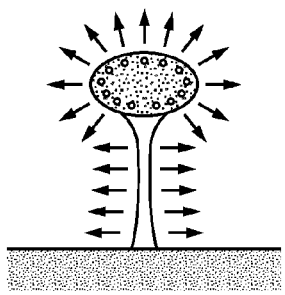
Figure 16F:
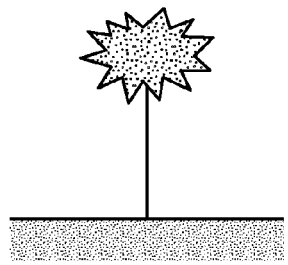
Figure 16G:
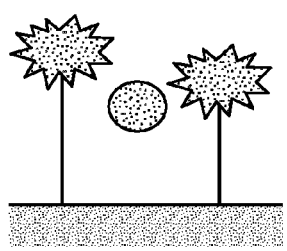
Figure 16H:
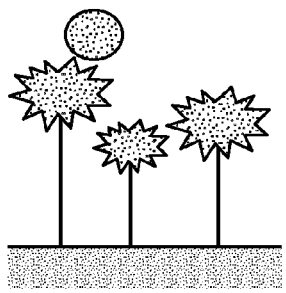
Figure 16I:
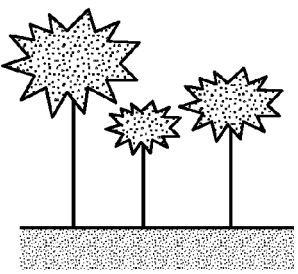

In some embodiments, the random orientation of CNTs can be observed by Raman spectroscopy with a polarized laser beam on the fractured polymer/CNT composites. Solutions of liquid epoxy prepolymers are prepared (typically in organic solvents such as N,N-dimethylformamide) with one or more amine curing agents, such solutions typically containing ca. 0.1 weight % of as-received SWNTs. These can then be atomized and sprayed onto a stationary surface, generating layered specimens of the SWNT/epoxy composite. After irradiating the fractured side of SWNT/epoxy composite with a polarlized laser, there was no significant change in Raman intensity as a result of rotating the sample's position to the incident laser beam by: 0 degrees, 45 degrees, and 90 degrees (see FIG. 13, traces a-c). The SWNT orientation in the composites can be observed by the ratio of the radial breathing mode (RBM) peak and the tangential mode (G) peak of Raman spectroscopy represent. The resulting SWNT/epoxy composite showed no significant change as a result of changing the incident laser beam angle. Therefore, SWNTs were randomly oriented in the composites (see FIG. 14).

In some embodiments, polymer/CNT can be aligned on a surface by adjusting process parameters, such as temperature of the preheated substrate, the rate of the spray, concentration of the CNTs/prepolymer/organic liquid, etc. A single shot (spray) of 0.5 weight % as-received SWNTs/epoxy/DMF was sprayed onto a preheated substrate. Referring to FIGS. 15(a) and 15(b), when the produced SWNT/epoxy composite sample was observed with optical microscopy, two different images were observed by changing the focal point with respect to sample position. By moving the focal point up and down, certain images are seen to appear and disappear. From this observation, many palm tree-like-SWNTs/epoxy columns were vertically aligned on the substrate. A possible mechanism for the formation of this structure is schematically depicted in FIGS. 16(a)-16(i). Therefore, SWNT/epoxy can be vertically aligned by this invention.

Figure 8:
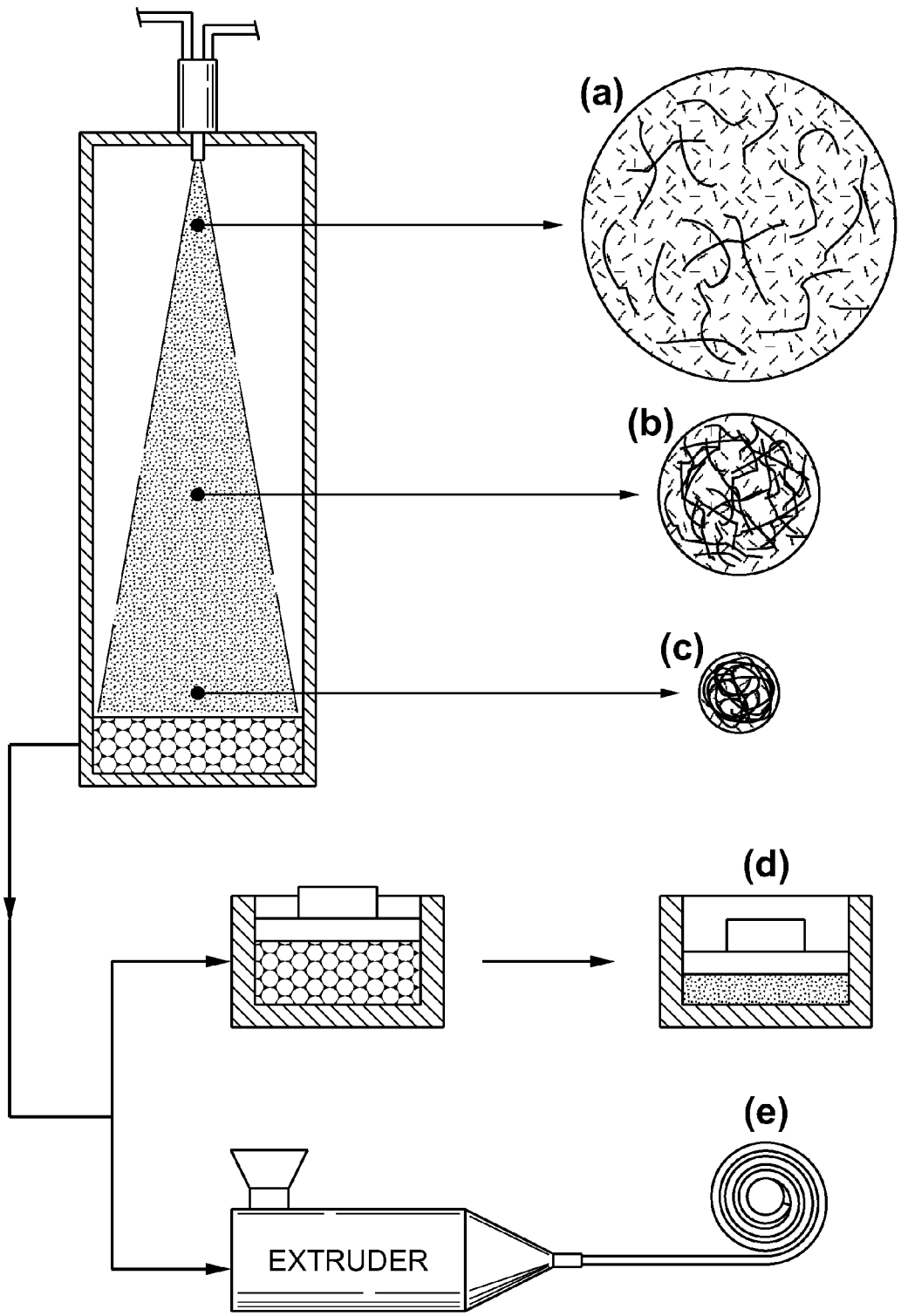
FIG. 8(a)-8(e) is a schematic diagram showing simultaneous solvent evaporation and initial polymerization as the droplets travel from a spray nozzle to a deposition surface (a-b), and illustrating how the B-stage CNT/prepolymer materials can be introduced into downstream processes such as compression (d) and extrusion (e), in accordance with some embodiments of the present invention.

In some embodiments, epoxy systems utilizing dual curing agents are employed. In such embodiments, the first agent (active at lower temperature in the range of ca. 80-140° C.) effects rapid polymerization of the resin to a B-stage (partially cured prepolymer) consistency, which stabilizes the penetration of the partially cured epoxy chains into the expanded SWNT networks. The second agent (active at high temperature in the range of 160-200° C.) activates during subsequent processing of the B-staged particles, thus completing the cure (crosslinking) of the macromolecular network that has penetrated the expanded, but still tangled, SWNTs. These two-stage systems can be sprayed into a heated chamber and/or deposited onto a moving surface (such as a rotating disc). A cross-sectional view of a suitable apparatus for carrying out such processes is shown in FIG. 8. Note the multiple means of regulating spray volume and intensity, air and surface temperature, speed of rotation, and chamber pressure, in order to enhance control of the simultaneous solvent evaporation and cure to B-stage. Batches of the partially-cured prepolymer particles (with or without incipient wetting with additional SWNTs) can then be processed by high-shear extrusion, following the techniques of Shofner et al. (Shofner et al., *J. Appl. Polym. Sci.* 2003, 89, 3081; Shofner et al., *Composites: Part A* 2003, 34; and M. L. Shofner: Ph. D. Thesis, Rice University, 2004) in order to produce homogeneous SWNT/epoxy composites with the desired shape(s).

Figure 17:
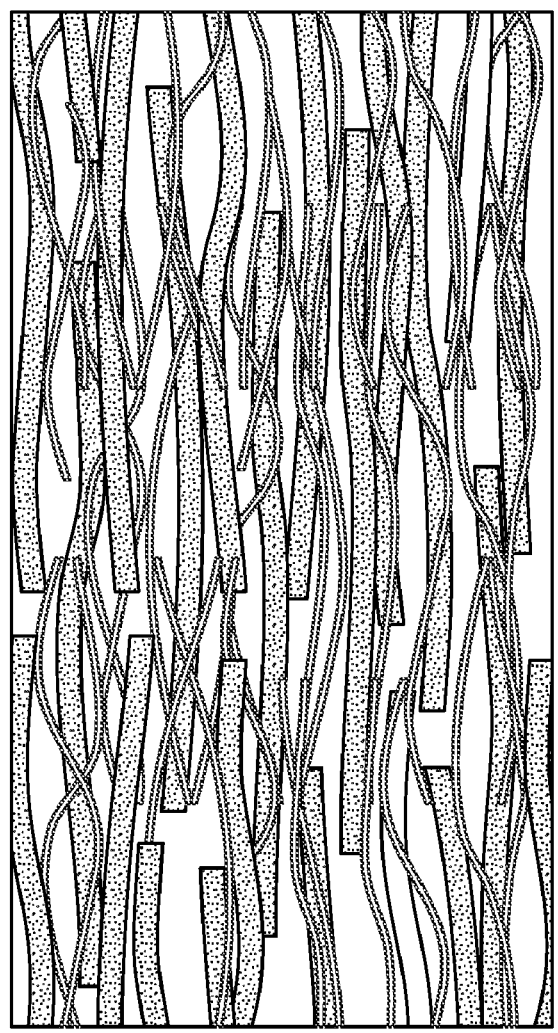
FIG. 17 is a schematic diagram of spun fiber comprising aligned SWNT ropes interconnected with an oriented macromolecular network, in accordance with some embodiments of the present invention.

A process based on dissolution of SWNTs in super acids (Davis et al., *Macromolecules* 2004, 37, 154) produces aligned SWNT ropes which are then spun into fibers using various coagulants to precipitate out the nanotubes (wet spinning process). The diameter of the spun fibers is about 3 orders of magnitude greater than the individual SWNTs. At the current state of that invention, the integrity and strength of the resulting fibers is based on secondary chemical bonds formed between the aligned SWNT ropes. One way to increase fiber strength would be to incorporate the aligned SWNT ropes into interpenetrating networks of crosslinked and aligned high-strength polymer chains, such as aromatic polyamides. The process would involve incorporation of the prepolymers in the SWNT solvent, their partial polymerization during the SWNT alignment process, and their further alignment and crosslinking as the fiber emerges from the spinnerets. A conceptual representation of the resulting fiber is shown in FIG. 17.

In conclusion, the present invention provides polymer/CNT composites, wherein the CNTs and polymer material form interpenetrating networks. Only by using the methods of the present invention can such composites be produced, wherein such composites possess property enhancement over those composite systems not formed via interpenetrating networks.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
   a) introducing CNTs and prepolymer molecules into a solvent to form a solvent mixture, wherein the solvent mutually:
      i) dissolves the prepolymer molecules; and
      ii) achieves molecular penetration into bundles of CNTs causing them to at least partially expand; and
   b) atomizing the solvent mixture into micro-droplets via spraying;
   c) rapidly removing the solvent from the micro-droplets and, simultaneously, at least partially curing the prepolymer to provide solid polymer/CNT particles; and
   d) depositing the solid polymer/CNT particles on a surface, causing the solid polymer/CNT particles to agglomerate while completing their cure, to form a polymer/CNT composite of desired size and shape.

2. The method of claim 1, wherein the CNTs are SWNTs.

3. The method of claim 1, wherein the CNTs are functionalized.

4. The method of claim 1, wherein the prepolymer is selected from the group consisting of epoxy resins, unsaturated polyester resins, vinyl ester resins, and combinations thereof.

5. The method of claim 1, wherein the at least partially curing of the prepolymer comprises at least one curing agent.

6. The method of claim 5, wherein the at least one curing agent is selected from the group consisting of di-amines, poly-amines, imidazoles, and combinations thereof.

7. The method of claim 1, wherein the step of introducing involves a technique selected from the group consisting of sonication, mechanical shear, heating, and combinations thereof.

8. The method of claim 1, wherein the step of rapidly removing solvent comprises exposure to a condition selected from the group consisting of heating, mechanical pumping, evacuation, and combinations thereof.

9. The method of claim 1 further comprising a second curing step to fully cure the prepolymer.

10. The method of claim 1, wherein the step of depositing the particles is done in combination with a curing method, said curing method selected from the group consisting of thermal curing, radiative curing, microwave curing, and combinations thereof, to effect crosslinking.

11. The method of claim 1, wherein the solid polymer/CNT particles are deposited on a rotating surface.

12. The method of claim 1, wherein the solid polymer/CNT particles have a size that ranges from about 1 micron to about 100 microns.

13. The method of claim 1, wherein the solvent mixture, comprising CNTs, prepolymer, and solvent, is formed immediately prior to being spayed through a nozzle.

14. The method of claim 1, further comprising multiple spray guns for atomizing the solvent mixture, wherein each spray gun sprays a different mixture.

15. The method of claim 1, wherein the CNTs in the polymer/CNT composite are aligned.

* * * * *